388-468 SR
OR RE 14,063 B DRAFTSMAN

UNITED STATES PATENT OFFICE.

PAUL DUDEN AND GUSTAV PETERS, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

PROCESS OF PREPARING ACETALDEHYDE FROM ACETYLENE.

RE. 14,063. Specification of Reissued Letters Patent. Reissued Feb. 15, 1916.

No Drawing. Original No. 1,151,928, dated August 31, 1915, Serial No. 2,076. Application for reissue filed January 4, 1916. Serial No. 70,284.

*To all whom it may concern:*

Be it known that we, PAUL DUDEN, Ph. D., professor of chemistry, and GUSTAV PETERS, Ph. D., chemist, citizens of the Empire of Germany, residing at Höchst-on-the Main, Germany, have invented certain new and useful Improvements in the Process of Preparing Acetaldehyde from Acteylene, of which the following is a specification.

In the manufacture of acetaldehyde from acetylene in presence of solutions containing mercury the latter gradually separates from the solutions in a metallic form owing to secondary reactions. In consequence thereof the absorption of the acetylene and the formation of the aldehyde are retarded accordingly as the separation of the metal occurs and finally cease completely if no fresh quantity of mercury salt or mercury oxid be added. The separated metallic mercury has hitherto been isolated and retransformed into mercury salts or into mercury oxids by means of concentrated acids or by anodic oxidation, and again introduced into the circuit of the process. This regeneration of the active mercury compounds, which must be effected separately, was very laborious from a technical point of view and entailed considerable losses of mercury. Now we have found that the said drawbacks can be entirely avoided by adding to the liquid of the reaction from the beginning of the process or in the course of it such an oxidizing agent as, on the one hand, impedes the separation of the mercury and, on the other hand, is not able under the working conditions employed, to oxidize to an appreciable extent either the acetylene, or the intermediately produced mercury-compounds of acetylene, or the aldehyde.

In our new process ferric compounds may, in the first place, be considered as technically suitable oxidizing agents. By the addition of them, the mercury separating in an extremely finely-subdivided form is retransformed in the nascent state into its active salt. The process can be continuously carried on by drawing off from time to time the resulting saturated solution of ferrous salt which is free from mercury and returning the same into the circuit of the process after having re-oxidized it to the ferric state, for example by atmospheric oxidation.

The following example illustrates our invention: 3 liters of sulfuric acid of about 6% strength and 90 grams of mercury sulfate and a small quantity of ferric sulfate are mixed in a vessel provided with a stirrer, cooling device and a receiver, and through this mixture a strong acetylene current is passed which carries along with it the acetaldehyde produced. At the same time a solution or a suspension of ferric sulfate is run in, so that there is always an excess of the oxidizing agent in the absorption-vessel. The absorption remains almost constant for many hours and does not diminish until the ferric sulfate contained in the solution is converted entirely into ferrous sulfate. The yield of aldehyde is almost quantitative.

Having now described our invention, what we claim is:—

1. The process of preparing acetaldehyde from acetylene, which consists in combining acetylene with the elements of water in presence of sulfuric acid, a mercury compound, and an agent capable of impeding the separation of mercury.

2. The process of preparing acetaldehyde from acetylene, which consists in combining acetylene with the elements of water in presence of a mercury compound and a ferric salt.

3. The process of preparing acetaldehyde from acetylene, which consists in combining acetylene with the elements of water in presence of a mercury compound and ferric sulfate.

PAUL DUDEN.
GUSTAV PETERS.

Copies of this patent may be obtained for five cents each, by addressing the "Commissioner of Patents, Washington, D. C."